United States Patent [19]

Young et al.

[11] 3,904,425

[45] Sept. 9, 1975

[54] ABSORPTIVE GLASS

[75] Inventors: Robert W. Young, Woodstock, Conn.; Robert E. Graf, Southbridge, Mass.

[73] Assignee: American Optical Corporation, Southbridge, Mass.

[22] Filed: June 12, 1964

[21] Appl. No.: 374,811

[52] U.S. Cl. .................................. 106/52; 106/50
[51] Int. Cl.² ................................... C03C 13/00
[58] Field of Search ........................... 106/50, 52

[56] References Cited
UNITED STATES PATENTS

| | | | |
|---|---|---|---|
| 2,676,109 | 4/1954 | Barnes et al. | 106/52 |
| 2,776,900 | 1/1957 | Duncan et al. | 106/52 |
| 2,898,219 | 8/1959 | Duncan et al. | 106/52 |
| 2,902,377 | 9/1959 | Duncan | 106/52 |
| 3,146,120 | 8/1964 | Upton et al. | 106/52 |
| 3,203,816 | 8/1965 | Bull et al. | 106/52 |

FOREIGN PATENTS OR APPLICATIONS

| | | | |
|---|---|---|---|
| 614,357 | 2/1961 | Canada | 106/52 |

*Primary Examiner*—Harvey E. Behrend
*Attorney, Agent, or Firm*—William C. Nealon; H. R. Berkenstock, Jr.

EXEMPLARY CLAIM

1. A glass material having a calculated oxide composition comprising

| | Percent by Weight |
|---|---|
| Silicon Dioxide ($SiO_2$) | 51.9 |
| Sodium Oxide ($Na_2O$) | 6.5 |
| Potassium Oxide ($K_2O$) | 6.8 |
| Calcium Oxide (CaO) | 6.5 |
| Antimony Trioxide ($Sb_2O_3$) | 0.4 |
| Aluminum Oxide ($Al_2O_3$) | 1.4 |
| Zinc Oxide (ZnO) | 2.2 |
| Titanium Dioxide ($TiO_2$) | 0.4 |
| Manganese Dioxide ($MnO_2$) | 23.4 |
| Chromium Oxide ($Cr_2O_3$) | 0.5 |
| Total | 100.0 | a 100 micron thickness of said glass material having an optical density greater than 0.25 at least for light from 0.4 to 0.6 microns wavelength.

6 Claims, No Drawings

ABSORPTIVE GLASS

The field of this invention is that of glass compositions and the invention relates more particularly to novel and improved absorptive glass materials.

In an important application of fiber optics, a great number of very small optical fibers each having a light-conducting glass core and a light-insulating glass cladding are fused together in side-by-side parallel relation to each other to form a vacuum-tight faceplate for a cathode-ray tube. In such devices, very fine filaments of light-absorbing glass material are fused between the optical fibers at spaced locations throughout the faceplate and the inner surface of the faceplate is coated with photo-emissive phosphors or the like. In this arrangement, the cathode-ray tube can form a light image on the inner surface of the faceplate in conventional manner and the optical fibers can each conduct light from a specific part of the image to reproduce the image with high resolution on the outer surface of the faceplate. The light-absorbing filaments absorb unwanted, stray light which is emitted by the tube phosphors but which is not conducted through specific optical fibers, thereby to assure that the stray light is not transmitted through the faceplate and does not wash out contrast between light and dark portions of the light image reproduced on the outer surface of the tube.

It is an object of this invention to provide a glass material having very high absorptive properties for use in forming light-absorbing filaments to be incorporated in fiber optical devices. It is therefore an important object of this invention to provide such an absorptive glass material which can be conveniently and economically drawn into the form of very fine filaments of substantially uniform diameter and absorptive properties. Further objects of this invention are to provide such absorptive glass materials which can be conveniently fused together with glass materials customarily embodied in optical fibers; to provide such glass materials which are stable under the temperatures to which cathode-ray tubes are subjected; and to provide such glass materials which are chemically unreactive with respect to phosphors and the like with which cathode-ray tube faceplates are frequently coated and which are particularly adapted for absorption of light of the wavelengths emitted by such phosphors. It is a specific object of this invention to provide such absorptive glass materials which have an optical density of 0.25 or more for thickness on the order of 100 microns at least for light of wavelengths between 0.4 and 0.6 microns. Other objects of this invention appear in the following detailed description of preferred embodiments of this invention.

It will be understood that optical fibers employed in thin cathode-ray tube faceplates are ordinarily on the order of 25–50 microns in diameter and that the light-absorbing filaments fused within the fiber faceplates must also be quite small in diameter and must be well dispersed throughout the faceplate if they are to be accommodated in the faceplates without adversely affecting light images transferred through the faceplate. This means that the absorptive properties of the glass materials of this invention must be very high with respect to light of the particular wavelengths emitted by phosphors usually employed on such faceplates if the filaments are to be effective in absorbing stray light emitted by the phosphors before it escapes from the faceplates. In fact it has been found that such glass materials should have optical densities at least as high as 0.25 in sample thickness as small as 100 microns at least for light of wavelengths between 0.4 and 0.6 microns. Expressed another way, this means that thicknesses of these glass materials as small as four thousandths (.004) of an inch should be adapted to provide for at least 75% absorption of the light from 0.4 to 0.6 microns wavelength incident thereon.

The absorptive glass material provided by this invention embodies silicon dioxide ($SiO_2$) as its major ingredient and also embodies sodium oxide ($Na_2O$) and/or potassium oxide ($K_2O$) as fluxes to aid in glass formation. The glass material further embodies calcium oxide (CaO) as a glass stabilizer and antimony trioxide ($Sb_2O_3$) to facilitate fining of the glass material. Preferably the glass also contains aluminum oxide ($Al_2O_3$) to promote durability of the glass. The glass material can also contain zinc oxide (ZnO) to further stabilize the glass and can contain titanium oxide ($TiO_2$) to help regulate viscosity of the glass.

In accordance with this invention, the glass material must contain one or more colorants selected from the group consisting of manganese dioxide ($MnO_2$), nickelic oxide ($Ni_2O_3$), chromium oxide ($Cr_2O_3$), ferric oxide ($Fe_2O_3$), cobalt oxide ($Co_3O_4$) and cupric oxide (CuO), the quantity of the selected colorant or colorants embodied in the glass being sufficient to provide the glass with an optical density of 0.25 even for very thin sheets or filaments of the glass as small as 100 microns thickness - at least for light from 0.4 to 0.6 microns wavelength. Where manganese dioxide comprises the sole colorant embodied in the glass, the manganese dioxide must comprise at least about 20 percent by weight of the glass material in order to achieve the minimum degree of optical density which is required. However additional manganese dioxide or other colorants can also be added for achieving greater optical densities without adversely affecting working properties of the glass material. On the other hand, where the manganese dioxide content of the glass material comprises less than 20 percent by weight of the glass material, the manganese dioxide must be supplemented by other colorants in order to provide the desired optical density. For example, where the manganese dioxide content of the glass is 12 percent by weight of the glass material, the manganese dioxide can be supplemented by at least 8 percent by weight of nickelic oxide alone. Similarly, where the manganese dioxide content of the glass material is omitted, the manganese dioxide can be replaced by at least 5 percent by weight of nickelic oxide and at least 3.5 percent by weight of cobalt oxide. The various ingredients of the glass material of this invention can of course be varied within certain limits so that the calculated oxide composition of this glass material can be set forth as follows:

|  | Percent by Weight |
| --- | --- |
| Silicon Dioxide ($SiO_2$) | 40 to 65 |
| Sodium Oxide ($Na_2O$) | 0 to 10 |
| Potassium Oxide ($K_2O$) | 0 to 10 |
| Calcium Oxide (CaO) | 4 to 9 |
| Antimony Trioxide ($Sb_2O_3$) | 0.3 to 1.0 |
| Aluminum Oxide ($Al_2O_3$) | 0 to 2 |
| Zinc oxide (ZnO) | 0 to 3 |
| Titanium Dioxide ($TiO_2$) | 0 to 2 | wherein the combined content of $Na_2O$ and $K_2O$ equals at least 10 percent by weight, said glass material including at least one colorant selected from the group consisting of

| | Percent by Weight |
|---|---|
| Manganese Dioxide ($MnO_2$) | 0 to 32 |
| Nickelic Oxide ($Ni_2O_3$) | 0 to 9 |
| Chromium Oxide ($Cr_2O_3$) | 0 to 0.5 |
| Ferric Oxide ($Fe_2O_3$) | 0 to 9 |
| Cobalt oxide ($Co_3O_4$) | 0 to 6 |
| Cupric Oxide (CuO) | 0 to 9 | wherein a content of $MnO_2$ less than 20 percent by weight is supplemented by others of said colorants for achieving an optical density of at least 0.25 in thicknesses of 100 microns at least for light of wavelengths between 0.4 and 0.6 microns.

Although various conventional ingredients can be employed for forming a glass material having calculated oxide compositions as set forth above, a preferred raw batch composition for achieving the glass material of this invention could comprise the following:

EXAMPLE I (BATCH)

| | Parts by Weight |
|---|---|
| Silicon Dioxide ($SiO_2$) | 3633 |
| Sodium Carbonate ($Na_2CO_3$) | 778 |
| Potassium Carbonate ($K_2CO_3$) | 833 |
| Calcium Carbonate ($CaCO_3$) | 813 |
| Antimony Trioxide ($Sb_2O_3$) | 28 |
| Aluminum Hydroxide ($Al(OH)_3$) | 150 |
| Zinc Oxide (ZnO) | 154 |
| Titanium Dioxide ($TiO_2$) | 28 |
| Manganese Dioxide ($MnO_2$) | 1638 |
| Chromium Oxide ($Cr_2O_3$) | 35 |
| Total | 8090 |

According to this invention, the described raw batch ingredients are weighed out and mixed in a conventional manner and are than placed in high-alumina clay pot. A zircon-mullite pot, a dense fire clay pot, or other conventional crucible means could also be employed. The pot is then placed in an electrical furnace of the silicon-carbide resistance type or other conventional furnace for melting the batch ingredients at a temperature of 2500°–2700° F. As the glass batch melts, additional batch material is added to the pot until the desired batch size is achieved. In a conventional electrical furnace, neutral or mildly oxidizing conditions will normally be established. However it has been found that reducing conditions provided by the addition of carbon, aluminum or silicon powders to the batch ingredients can also be employed in making the glasses of this invention. After melting of the batch ingredients has been accomplished, the batch is maintained at a temperature of 2300°–2500° F for 1–3 hours during fining of the batch in conventional manner. The batch is then cooled slowly with stirring and is cast at a temperature of 2000°–2200° F. The glass can then be annealed for several hours at a temperature of 900°–1100° F. and can be slowly cooled to room temperature over night.

The calculated oxide composition of glass prepared from such batch ingredients is as follows:

EXAMPLE I

| | Percent by Weight |
|---|---|
| Silicon Dioxide ($SiO_2$) | 51.9 |
| Sodium Oxide ($Na_2O$) | 6.5 |
| Potassium Oxide ($K_2O$) | 6.8 |
| Calcium Oxide (CaO) | 6.5 |
| Antimony Trioxide ($Sb_2O_3$) | 0.4 |
| Aluminum Oxide ($Al_2O_3$) | 1.4 |
| Zinc Oxide (ZnO) | 2.2 |
| Titanium Dioxide ($TiO_2$) | 0.4 |
| Manganese Dioxide ($MnO_2$) | 23.4 |
| Chromium Oxide ($Cr_2O_3$) | 0.5 |
| Total | 100.0 | said glass having an optical density greater than 0.25 in a sample sheet of glass of 100 microns thickness at least for light from 0.4 to 0.6 microns wavelength.

Other examples illustrating calculated oxide compositions of absorptive glass materials provided by this invention are as follows:

EXAMPLE 2

| | Percent by Weight |
|---|---|
| Silicon Dioxide ($SiO_2$) | 54.6 |
| Sodium Oxide ($Na_2O$) | 6.9 |
| Potassium Oxide ($K_2O$) | 7.1 |
| Calcium Oxide (CaO) | 6.8 |
| Antimony Trioxide ($Sb_2O_3$) | .4 |
| Aluminum Oxide ($Al_2O_3$) | 1.5 |
| Zinc Oxide (ZnO) | 2.3 |
| Titanium Dioxide ($TiO_2$) | .4 |
| Manganese Dioxide ($MnO_2$) | 20 |
| Total | 100.0 | this glass material having an optical density greater than 0.25 in a thickness of 100 microns for light at least from 0.4 to 0.6 microns wavelength.

EXAMPLE 3

| | Percent by Weight |
|---|---|
| Silicon Dioxide ($SiO_2$) | 61.6 |
| Sodium Oxide ($Na_2O$) | 7.8 |
| Potassium Oxide ($K_2O$) | 8.0 |
| Calcium Oxide (CaO) | 7.7 |
| Antimony Trioxide ($Sb_2O_3$) | .5 |
| Aluminum Oxide ($Al_2O_3$) | 1.7 |
| Zinc Oxide (ZnO) | 2.6 |
| Titanium Dioxide ($TiO_2$) | .5 |
| Nickelic Oxide ($Ni_2O_3$) | 6 |
| Cobalt Oxide ($Co_3O_4$) | 3.6 |
| Total | 100.0 | this glass material having an optical density greater than 0.25 in a thickness of 100 microns at least for light from 0.4 to 0.6 microns wavelength.

EXAMPLE 4

| | Percent by Weight |
|---|---|
| Silicon Dioxide ($SiO_2$) | 46.38 |
| Sodium Oxide ($Na_2O$) | 5.85 |
| Potassium Oxide ($K_2O$) | 6.05 |
| Calcium Oxide (CaO) | 5.78 |
| Antimony Trioxide ($Sb_2O_3$) | .34 |
| Aluminum Oxide ($Al_2O_3$) | 1.29 |
| Zinc Oxide (ZnO) | 1.97 |
| Titanium Dioxide ($TiO_2$) | .34 |
| Manganese Dioxide ($MnO_2$) | 23.4 |
| Ferric Oxide ($Fe_2O_3$) | 5.1 |
| Cobalt Oxide ($Co_3O_4$) | 3.5 | this glass material having an optical density greater than 0.25 in a thickness of 100 microns at least for light from 0.4 to 0.6 microns wavelength.

Other examples of glass compositions provided by this invention, all of which provide optical densities greater than 0.25 for light of the desired wavelengths, are as follows:

|  | Percent by Weight | | | | | | | | |
|---|---|---|---|---|---|---|---|---|---|
|  | Ex. 5 | Ex. 6 | Ex. 7 | Ex. 8 | Ex. 9 | Ex. 10 | Ex. 11 | Ex. 12 | Ex. 13 |
| $SiO_2$ | 52.1 | 51.8 | 52 | 51.9 | 48.42 | 48.42 | 49.52 | 46.04 | 51.5 |
| $Na_2O$ | 6.6 | 6.6 | 6.5 | 6.5 | 6.06 | 6.06 | 6.2 | 5.76 | 6.5 |
| $K_2O$ | 6.8 | 6.8 | 6.8 | 6.8 | 6.34 | 6.34 | 6.48 | 6.03 | 6.7 |
| CaO | 6.5 | 6.5 | 6.5 | 6.5 | 6.06 | 6.06 | 6.2 | 5.76 | 6.4 |
| $Sb_2O_3$ | .4 | .4 | .4 | .4 | .38 | .38 | .38 | .36 | .4 |
| $Al_2O_3$ | 1.4 | 1.4 | 1.4 | 1.4 | 1.31 | 1.31 | 1.34 | 1.24 | 1.4 |
| ZnO | 2.2 | 2.2 | 2.2 | 2.2 | 2.05 | 2.05 | 2.10 | 1.95 | 2.2 |
| $TiO_2$ | .4 | .4 | .4 | .4 | .38 | .38 | .38 | .36 | .4 |
| $MnO_2$ | 23.4 | 23.4 | 23.4 | 23.4 | 23.4 | 23.4 | 23.4 | 23.4 | 23.3 |
| $Cr_2O_3$ | .2 | .6 | .4 | .5 | .5 | .5 | .5 | .5 | 1.2 |
| $Fe_2O_3$ | — | — | — | — | 5.1 | 5.1 | — | 5.1 | — |
| $Co_3O_4$ | — | — | — | — | — | — | 3.5 | 3.5 | — |

|  | Ex. 14 | Ex. 15 | Ex. 16 | Ex. 17 | Ex. 18 | Ex. 19 | Ex. 20 | Ex. 21 |
|---|---|---|---|---|---|---|---|---|
| $SiO_2$ | 50.8 | 51.9 | 49.52 | 53.1 | 52.3 | 51.4 | 51.4 | 54.6 |
| $Na_2O$ | 6.4 | 6.6 | 6.3 | 6.7 | 6.6 | 6.5 | 6.5 | 6.9 |
| $K_2O$ | 6.6 | 6.8 | 6.48 | 6.9 | 6.8 | 6.7 | 6.7 | 7.1 |
| CaO | 6.3 | 6.5 | 6.2 | 6.6 | 6.9 | 6.4 | 6.4 | 6.8 |
| $Sb_2O_3$ | .4 | .4 | .38 | .4 | .4 | .4 | .4 | .4 |
| $Al_2O_3$ | 1.4 | 1.4 | 1.34 | 1.5 | 1.4 | 1.4 | 1.4 | 1.5 |
| ZnO | 2.2 | 2.2 | 2.10 | 2.2 | 2.2 | 2.2 | 2.2 | 2.3 |
| $TiO_2$ | .4 | .4 | .38 | .4 | .4 | .4 | .4 | .4 |
| $MnO_2$ | 23.2 | 19.1 | 19.1 | 17.6 | 17.6 | 17.6 | 17.6 | 12.0 |
| $Ni_2O_3$ | — | — | — | — | — | — | — | 8 |
| $Cr_2O_3$ | 2.3 | — | — | 2.3 | 3.5 | 4.7 | 3.5 | — |
| $Fe_2O_3$ | — | — | — | 2.3 | 2.3 | 2.3 | 3.5 | — |
| $Co_3O_4$ | — | — | 3.5 | — | — | — | — | — |
| CuO | — | 4.7 | 4.7 | — | — | — | — | — |

The absorptive glass materials provided by this invention are very stable and are chemically and thermally compatible with conventional glasses employed in optical fibers. The absorptive glasses can be readily drawn and redrawn into very thin filaments of substantially uniform diameter and absorptive properties and can be readily drawn with and fused together with conventional optical fiber glass materials. The absorptive glass materials are also chemically compatible with phosphors and the like conventionally employed in cathode-ray tubes and the like. The absorptive glass can also be conveniently ground or polished even when embodied in faceplates or the like in the form of thin filaments.

It will be understood that the specific examples of glass composition have been set forth above by way of illustration but that this invention includes all modifications and equivalents thereof which fall within the scope of the appended claims.

We claim:

1. A glass material having a calculated oxide composition comprising

|  | Percent by Weight |
|---|---|
| Silicon Dioxide ($SiO_2$) | 51.9 |
| Sodium Oxide ($Na_2O$) | 6.5 |
| Potassium Oxide ($K_2O$) | 6.8 |
| Calcium Oxide (CaO) | 6.5 |
| Antimony Trioxide ($Sb_2O_3$) | 0.4 |
| Aluminum Oxide ($Al_2O_3$) | 1.4 |
| Zinc Oxide (ZnO) | 2.2 |
| Titanium Dioxide ($TiO_2$) | 0.4 |
| Manganese Dioxide ($MnO_2$) | 23.4 |
| Chromium Oxide ($Cr_2O_3$) | 0.5 |
| Total | 100.0 | a 100 micron thickness of said glass material having an optical density greater than 0.25 at least for light from 0.4 to 0.6 microns wavelength.

2. A glass material having a calculated oxide composition comprising

|  | Percent by Weight |
|---|---|
| Silicon Dioxide ($SiO_2$) | 54.6 |
| Sodium Oxide ($Na_2O$) | 6.9 |
| Potassium Oxide ($K_2O$) | 7.1 |
| Calcium Oxide (CaO) | 6.8 |
| Antimony Trioxide ($Sb_2O_3$) | .4 |
| Aluminum Oxide ($Al_2O_3$) | 1.5 |
| Zinc Oxide (ZnO) | 2.3 |
| Titanium Dioxide ($TiO_2$) | .4 |
| Manganese Dioxide ($MnO_2$) | 20 | a 100 micron thickness of said glass material having an optical density greater than 0.25 at least for light from 0.4 to 0.6 microns wavelength.

3. A glass material having a calculated oxide composition comprising

|  | Percent by Weight |
|---|---|
| Silicon Dioxide ($SiO_2$) | 61.6 |
| Sodium Oxide ($Na_2O$) | 7.8 |
| Potassium Oxide ($K_2O$) | 8.0 |
| Calcium Oxide (CaO) | 7.7 |
| Antimony Trioxide ($Sb_2O_3$) | .5 |
| Aluminum Oxide ($Al_2O_3$) | 1.7 |
| Zinc Oxide (ZnO) | 2.6 |
| Titanium Dioxide ($TiO_2$) | .5 |
| Nickelic Oxide ($Ni_2O_3$) | 6 |
| Cobalt Oxide ($Co_3O_4$) | 3.6 | a 100 micron thickness of said glass material having an optical density greater than 0.25 at least for light from 0.4 to 0.6 microns wavelength.

4. A glass material having a calculated composition comprising

|  | Percent by Weight |
|---|---|
| Silicon Dioxide (SiO$_2$) | 46.38 |
| Sodium Oxide (Na$_2$O) | 5.85 |
| Potassium Oxide (K$_2$O) | 6.05 |
| Calcium Oxide (CaO) | 5.78 |
| Antimony Trioxide (Sb$_2$O$_3$) | .34 |
| Aluminum Oxide (Al$_2$O$_3$) | 1.29 |
| Zinc Oxide (ZnO) | 1.97 |
| Titanium Dioxide (TiO$_2$) | .34 |
| Manganese Dioxide (MnO$_2$) | 23.4 |
| Ferric Oxide (Fe$_2$O$_3$) | 5.1 |
| Cobalt Oxide (Co$_3$O$_4$) | 3.5 | a 100 micron thickness of said glass material having an optical density greater than 0.25 at least for light from 0.4 to 0.6 microns wavelength.

5. A glass material having a calculated oxide composition comprising

|  | Percent by Weight |
|---|---|
| Silicon Dioxide (SiO$_2$) | 40 to 65 |
| Sodium Oxide (Na$_2$O) | 0 to 10 |
| Potassium Oxide (K$_2$O) | 0 to 10 |
| Calcium Oxide (CaO) | 4 to 9 |
| Antimony Trioxide (Sb$_2$O$_3$) | .3 to 1.0 |
| Aluminum Oxide (Al$_2$O$_3$) | 0 to 2 |
| Zinc Oxide (ZnO) | 0 to 3 |
| Titanium Dioxide (TiO$_2$) | 0 to 2 | wherein the combined content of Na$_2$O and K$_2$O equals at least 10 percent by weight, said glass material including at least one colorant selected from the group consisting of

|  | Percent by Weight |
|---|---|
| Manganese Dioxide (MnO$_2$) | 12 to 32 |
| Nickelic Oxide (Ni$_2$O$_3$) | 0 to 9 |
| Chromium Oxide (Cr$_2$O$_3$) | 0 to 0.5 |
| Ferric Oxide (Fe$_2$O$_3$) | 0 to 9 |
| Cobalt Oxide (Co$_3$O$_4$) | 0 to 6 |
| Cupric Oxide (CuO) | 0 to 9 | wherein a content of MnO$_2$ less than 20 percent is supplemented by others of said colorants in order to achieve an optical density of at least 0.25 in a thickness of 100 microns at least for light from 0.4 to 0.6 microns wavelength.

6. A glass material having a calculated oxide composition comprising

|  | Percent by Weight |
|---|---|
| Silicon Dioxide (SiO$_2$) | 46.04 to 54.6 |
| Sodium Oxide (Na$_2$O) | 5.76 to 6.9 |
| Potassium Oxide (K$_2$O) | 6.03 to 7.1 |
| Calcium Oxide (CaO) | 5.76 to 6.8 |
| Antimony Trioxide (Sb$_2$O$_3$) | .34 to .4 |
| Aluminum Oxide (Al$_2$O$_3$) | 1.24 to 1.5 |
| Zinc Oxide (ZnO) | 1.95 to 2.3 |
| Titanium Dioxide (TiO$_2$) | .34 to .4 | wherein the combined content of Na$_2$O and K$_2$O equals at least 11.79 percent by weight, said glass material including at least one colorant selected from the group consisting of

|  | Percent by Weight |
|---|---|
| Manganese Dioxide (MnO$_2$) | 12 to 23.4 |
| Nickelic Oxide (Ni$_2$O$_3$) | 0 to 8 |
| Chromium Oxide (Cr$_2$O$_3$) | 0 to 4.7 |
| Ferric Oxide (Fe$_2$O$_3$) | 0 to 5.1 |
| Cobalt Oxide (Co$_3$O$_4$) | 0 to 3.5 |
| Cupric Oxide (CuO) | 0 to 4.7 | wherein a content of MnO$_2$ less than 20 percent is supplemented by others of said colorants in order to achieve an optical density of at least 0.25 in a thickness of 100 microns at least for light from 0.4 to 0.6 microns wavelength.

* * * * *